US012747259B2

(12) United States Patent
Loiseau et al.

(10) Patent No.: US 12,747,259 B2
(45) Date of Patent: Sep. 29, 2026

(54) PROCESS OF MAKING SULFONATED LIGNIN-BASED COMPOSITIONS, SULFONATED LIGNIN-BASED COMPOSITIONS SO-OBTAINED AND THEIR USE

(71) Applicant: RG DISPERSANTS LTD., Candiac (CA)

(72) Inventors: Francis Loiseau, Saint-Hubert (CA); Mario Dupuis, Greenfield Park (CA); Iordana Triantafillu, Brossard (CA)

(73) Assignee: RG DISPERSANTS LTD., Candiac (CA)

( * ) Notice: Subject to any disclaimer, the term of this patent is extended or adjusted under 35 U.S.C. 154(b) by 814 days.

(21) Appl. No.: 17/624,617

(22) PCT Filed: Jul. 3, 2020

(86) PCT No.: PCT/CA2020/050925

§ 371 (c)(1),
(2) Date: Jan. 4, 2022

(87) PCT Pub. No.: WO2021/003561

PCT Pub. Date: Jan. 14, 2021

(65) Prior Publication Data

US 2022/0259245 A1 Aug. 18, 2022

Related U.S. Application Data

(60) Provisional application No. 62/870,961, filed on Jul. 5, 2019.

(51) Int. Cl.

| | |
|---|---|
| ***C07G 1/00*** | (2011.01) |
| ***C04B 24/18*** | (2006.01) |
| ***C08L 97/00*** | (2006.01) |
| ***C09K 8/467*** | (2006.01) |
| *C04B 103/30* | (2006.01) |
| *C04B 103/40* | (2006.01) |

(52) U.S. Cl.

CPC ................ *C07G 1/00* (2013.01); *C04B 24/18* (2013.01); *C08L 97/005* (2013.01); *C09K 8/467* (2013.01); *C04B 2103/302* (2013.01); *C04B 2103/408* (2013.01)

(58) Field of Classification Search

CPC ..... C07G 1/00; C04B 24/18; C04B 2103/302; C04B 2103/408; C08L 97/005; C09K 8/467

USPC ...................................................... 106/162.1

See application file for complete search history.

(56) References Cited

U.S. PATENT DOCUMENTS

| | | | |
|---|---|---|---|
| 4,007,004 A | 2/1977 | Bailey, III et al. | |
| 4,740,590 A | 4/1988 | Dilling | |
| 4,797,157 A | 1/1989 | Dilling et al. | |
| 4,892,588 A | 1/1990 | Dilling et al. | |
| 5,049,661 A | 9/1991 | Dilling | |
| 5,811,527 A | 9/1998 | Ishitoku et al. | |
| 5,980,589 A | 11/1999 | Dilling et al. | |
| 6,227,294 B1 | 5/2001 | Chatterji et al. | |
| 6,558,461 B2 | 5/2003 | Lebo, Jr. et al. | |
| 7,691,982 B2 | 4/2010 | Tomita et al. | |
| 8,987,427 B1 | 3/2015 | Qiu et al. | |
| 2013/0096285 A1* | 4/2013 | Qiu .......................... | C08H 6/00 530/501 |

FOREIGN PATENT DOCUMENTS

| | | |
|---|---|---|
| CA | 1217038 | 1/1987 |
| CN | 101575418 A | 11/2009 |
| CN | 103265984 A | 8/2013 |
| WO | 2015/049424 A1 | 4/2015 |
| WO | 2017/077198 A1 | 5/2017 |
| WO | 2018/122470 A1 | 7/2018 |

OTHER PUBLICATIONS

Zakzeski et al. "The Catalytic Valorization of Lignin for the Production of Renewable Chemicals". Chemical Reviews, 2010, p. 1-49. (Year: 2010).*

Gellerstedt et al. "Softwood kraft lignin: Raw material for the future". Industrial Crops and Products 77 (2015) 845-854. (Year: 2015).*

Han et al. "Evolution of sulfur during fast pyrolysis of sulfonated Kraft lignin". Journal of Analytical and Applied Pyrolysis 133 (2018) 162-168. (Year: 2018).*

Inwood, J. P. W., Pakzad, L., and Fatehi, P. Production of sulfur containing kraft lignin products. BioResources 13(1), 53-70 (2018).

Thomas Aro and Pedram Fatehi. Production and Application of Lignosulfonates and Sulfonated Lignin. ChemSusChem Reviews, 2017, 10, 1861-1877.

Da-Feng Zheng, Ran Chen, Xiao-Kang Li. Investigation of grafted sulfonated black liquor as wet-ready mortar admixture. Environmental Progress & Sustainable Energy, 2016, vol. 35, No. 5, 1395-1399.

(Continued)

*Primary Examiner* — Coris Fung

(74) *Attorney, Agent, or Firm* — Ram W. Sabnis

(57) ABSTRACT

Process for preparing a composition comprising a sulfonated lignin, including: preparing a lignin-containing aqueous suspension having a solids content up to about 45 wt % and a pH greater than about 6, by mixing a lignin with water; heating the aqueous suspension between about 65° C. and 160° C.; sulfonating the lignin using a sulfonating agent generating a sulfite ion and/or bisulfite ion, at a temperature of from about 90° C. to 160° C., at a sulfonation pH of from about 6 to 11 and at a molar ratio of sulfonating agent to lignin between about 0.1:1 and 1.5:1 on a sulfite to monomeric lignin sub-unit basis; and cooling the sulfonated lignin-containing resulting mixture. The sulfonated lignin, in aqueous mixture or as a powder, can be used as a dispersant in several products including for instance concrete, grout, mortar, oil-well cement, cement board, gypsum wallboard, agricultural products, drilling fluids, coal slurries.

17 Claims, No Drawings

(56) References Cited

OTHER PUBLICATIONS

Guang Yu, Bin Li, Haisong Wang, Chao Liu, Xindong Mu. Preparation of Concrete Superplasticizer by Oxidation-Sulfomethylation of Sodium Lignosulfonate. BioResources 8(1), 1055-1063 (2013).
G. Syahbirin, A.A. Darwis, A. Suryani, W. Syafii. Potential of Lignosulphonate of Eucalyptus Lignin from Pulp Plant as Dispersant in Gypsum Paste. Procedia Chemistry 4 (2012) 343-351.
Magnus Norgren, Hakan Edlund. Lignin: Recent advances and emerging applications. Current Opinion in Colloid & Interface Science 19 (2014) 409-416.
Wenming He and Pedram Fatehi, Preparation of sulfomethylated softwood kraft lignin as a dispersant for cement admixture. RSC Advances, 2015.
Wenming He and Pedram Fatehi, Preparation of sulfomethylated softwood kraft lignin as a dispersant for cement admixture. RSC Advances, 2015—Supporting Information.
Mohan K R Konduri. Production of Water-Soluble Hardwood Kraft Lignin via Sulfomethylation Using Formaldehyde and Sodium Sulfite. ACS Sustainable Chem, 2015.
John Paul William Inwood, Sulfonation of kraft lignin to water soluble value added products. Thesis—Lakehead University Jul. 25, 2014.
Yasuyuki Matsushita. Conversion of technical lignins to functional materials with retained polymeric properties. Journal of Wood Science (2015) 61: 230-250.
Stella Brudin, Peter Schoenmakers. Analytical methodology for sulfonated lignins. Journal of Separation Science, 2010, 33, 439-452.
Norah Alwadani, Pedram Fatehi. Synthetic and lignin-based surfactants: Challenges and opportunities. Carbon Resources Conversion 1 (2018) 126-138.
Yanlin Qin, Lixuan Yu, Ruchun Wu, Dongjie Yang, Xueqing Qiu, and J. Y. Zhu Biorefinery Lignosulfonates from Sulfite-Pretreated Softwoods as Dispersant for Graphite. ACS Sustainable Chemistry & Engineering, 2016, 4, 2200-2205.
Yanlin Qin, Dongjie Yang, Wenyuan Guo, Xueqing Qiu. Investigation of grafted sulfonated alkali lignin polymer as dispersant in coal-water slurry. Journal of Industrial and Engineering Chemistry 27 (2015) 192-200.
J. J. Meister. Modification of lignin. Journal of Macromolecular Science Part C: Polymer Reviews C42(2), 235-289 (2002).
Pooya Azadi, Oliver R. Inderwildi, Ramin Farnood, David A. King. Liquid fuels, hydrogen and chemicals from lignin: A critical review. Renewable and Sustainable Energy Reviews 21 (2013) 506-523.
Magnus Norgren, Håkan Edlund. Stabilisation of kraft lignin solutions by surfactant additions. Colloids and Surfaces A Physicochemical and Engineering Aspects 194 (2001) 239-248.
Office Action CN 202080049107.9 Issued Nov. 14, 2022.

* cited by examiner

PROCESS OF MAKING SULFONATED LIGNIN-BASED COMPOSITIONS, SULFONATED LIGNIN-BASED COMPOSITIONS SO-OBTAINED AND THEIR USE

CROSS-REFERENCE TO RELATED APPLICATIONS

This application is the National Stage of International Application No. PCT/CA2020/050925, filed on Jul. 3, 2020 claiming the priority of U.S. Provisional Ser. No. 62/870,961, filed on Jul. 5, 2019, the content of each of which is incorporated by reference herein.

TECHNICAL FIELD

The technical field generally relates to a process for making sulfonated lignin-containing compositions and to the compositions so-obtained and their use. The process includes the sulfonation of Kraft or soda lignins using sulfite and/or bisulfite ions under selected operating conditions.

BACKGROUND

Dispersants, which can also be referred to as water reducers, plasticizers or superplasticizers, are common in the concrete and gypsum industries. They interact with and adsorb to the surface of a binder (e.g. cement or stucco particles), thus preventing agglomeration or flocculation through either steric or electrostatic repulsion. They allow for reduction of viscosity and increase workability at lower water to binder ratio.

Differences in dispersing ability can allow for a product to be used at different water reduction levels. For concrete applications, water reducers are commonly categorized into i) low range water reducers (LRWR) having less than about 5% water reduction (WR), ii) mid range water reducers (MRWR) having between about 5 to about 12% WR, and iii) high range water reducers (HRWR) having over about 12% WR. In a given application, at a desired workability and water reduction, the choice of a dispersant will depend on its required dosage and economical viability of usage. Additionally, the dispersant will be selected to present minimal impact on other properties of the final material, including the setting time, durability or engineering properties of a concrete, or the stiffening time, hydration onset and hydration profile of a gypsum product.

Similar products with dispersing and water reducing functions can also be used in grout, mortar, oil-well cementing, cement board or gypsum wallboard manufacturing or coal slurries. Dispersing properties of such products also allow their use in agricultural products or drilling fluids.

Some dispersants, including certain types of anionic polymers of various structures and sizes, can be used in other applications, including as binding agents in agricultural products (e.g. fertilizers) or coal, as well as tanning agents.

Amongst known products used as dispersants, three main categories are used in concrete and gypsum: the polynaphtalene sulfonates (PNS), the polycarboxylate ethers (PCE) and the lignosulfonates.

The PNS form the industry standard and original class of HRWR. They are manufactured using coal-based technology and are non-renewable. PNS are used as LRWR, MRWR, HRWR in concrete and commonly used also in gypsum. PNS can be modified to be adapted to a specific application, but the possible modifications are limited.

The PCE are based on polyacrylates and thus linked to petrochemical industry. They are non-renewable. PCE are used as LRWR, MRWR, HRWR in concrete, but barely used in wallboard manufacturing. PCE require a lower dosage than PNS but are more sensitive and can cause issues with some raw materials (e.g. clay content in sand or gypsum). This sensitivity to variation in other raw materials generally make them unsuitable for use in a continuous process like gypsum wallboard manufacturing. Though significantly more performant in most applications, PCE's price is much higher than PNS' price and thus using PCE is roughly comparable in cost to using PNS, in many applications.

The lignosulfonates are extracted from wood through the sulfite pulping process. They are derived from a pulping technique that represents less than 10% of pulp and paper mills worldwide. They are used in concrete and also in wallboard manufacturing. As dispersants, their use can be associated with severe impact on retardation of hydration in most fields of use. This can be problematic and typically limits their use at low dosages in LRWR in concrete. In addition, the inconsistency of lignosulfonates from lot to lot can make them unsuitable for use in a continuous process like gypsum wallboard manufacturing.

All three classes of dispersants discussed above provide useful initial workability within their applications, while typically resulting in more or less rapid loss of workability over time. They can be modified in some variations or specifically formulated with additives targeting long-term retention of workability. In some cases, specifically with lignosulfonates, increasing the dosage impairs and further lowers the workability retention profile (i.e. they present a more severe drop in workability/fluidity over time).

Hence, there is an interest for varying the sources and types of dispersants. There is a growing need for renewable-based materials that would improve upon commercial lignosulfonates derived from the sulfite process and also target new applications.

There exist several processes to separate lignin, which represents 20-30% of plants on a weight basis, from cellulosic components in wood and non-wood plant materials. These processes include the solvolysis, the soda process, the sulfite process, the Kraft process and many others. Over 80% of pulping operations in North America are operated with the Kraft process. This Kraft process can be applied to all types of plants, wood based (hardwood and softwood), or non-wood based (e.g. switchgrasses, bamboo, etc.).

Kraft lignin can be extracted from black liquor resulting from the Kraft process. The extraction process can be performed through the precipitation of lignin through acidification typically using $CO_2$ and sulfuric acid. This extraction process can be complex to control. From up to 10-25% of the lignin can be extracted without adverse effects on the remainder of the Kraft process. Some issues have historically been present in terms of repeatability and level of purity of the material obtained. In recent years, several processes have improved and normalized the extraction and purification of Kraft lignins, broadening their use in various applications and other processes. For instance, the LignoForce™ and LignoBoost™ processes can extract lignin from Kraft black liquor to produce high quality Kraft lignin.

It is known that during the Kraft pulping process, lignin degrades at least through hydrolysis and breakage of links in between monolignol subunits. This reaction generates new functionalities that can condense again in the pulping conditions. Though separated from cellulosic materials, it is understood and accepted that the number of sites in the lignin still available for reactivity remains low. This type of lignin is also showing a very low solubility in aqueous media, unless brought to a high pH (pH>11.0).

Various solutions have been proposed to counter this low reactivity and low solubility. For instance, working with Kraft lignin at high reaction pH and low solids content can allow addressing solubility issues. Other solutions can include modifying the Kraft lignin, such as increasing their functionality through reactions targeting the introduction of grafts, through oxidation, or through combined functionalization on the aromatic ring (sulfomethylation) and aliphatic side chains (sulfonation). These modifications which introduce higher functionalization can also allow increasing the number of charges on the lignin, which in turn can enhance the dispersing potential of Kraft lignins. However, these methods for modifying Kraft lignins generally require a purification step (e.g. ultrafiltration) which is typically performed at high costs.

Hence, a new process to manufacture a lignin-containing dispersant in mild conditions is desirable. A process for modifying a lignin, without having to resort to over-functionalization, and which can be exempt of costly purification steps, is also desirable.

SUMMARY

It is therefore an aim of the present technology to address the above-mentioned issues.

In accordance with an aspect, there is provided a process for preparing a composition comprising a sulfonated lignin, wherein the process comprises the following steps:

- preparation of a lignin-containing aqueous suspension having a solids content of up to about 45 wt % and a pH greater than about 6, by mixing a lignin with water;
- heating the lignin-containing aqueous suspension to at least about 65° C. and up to about 160° C. under stirring to obtain a heated lignin-containing aqueous suspension;
- sulfonation of the lignin to obtain a sulfonated lignin-containing mixture, by adding a sulfonating agent to the heated lignin-containing aqueous suspension, the sulfonating agent generating a sulfite ion, a bisulfite ion or a mixture thereof in the aqueous suspension, the sulfonation being performed under stirring at a sulfonation temperature of at least about 90° C. and up to about 160° C., at a sulfonation pH of from about 6 to about 11 and using a molar ratio of the sulfonating agent to the lignin between about 0.1:1 to about 1.5:1 on a sulfite to monomeric lignin sub-unit basis; and
- cooling the sulfonated lignin-containing mixture.

In an optional aspect, the preparation of the lignin-containing aqueous suspension can be performed in the presence of a base.

In another optional aspect, the lignin can comprise a Kraft lignin, a soda lignin or a mixture thereof.

In another optional aspect, the preparation of the lignin-containing aqueous suspension can be performed in the presence of a surface-active agent.

In another optional aspect, the sulfonation step of the process comprises:

- adding the sulfonating agent to the heated lignin-containing aqueous in one or more addition steps,
- adding additional water to adjust the solids content, and
- adjusting the sulfonation temperature.

In another optional aspect, the sulfonation step of the process comprises:

- adding the sulfonating agent to the heated lignin-containing aqueous in one or more addition steps,
- adding additional base to adjust the sulfonation pH, and
- adjusting the sulfonation temperature.

In another optional aspect, the sulfonation step of the process comprises:

- adding the sulfonating agent to the heated lignin-containing aqueous in one or more addition steps,
- adding additional water and base to adjust the sulfonation pH and the solids content, and
- adjusting the sulfonation temperature.

In another optional aspect, the sulfonation step of the process comprises:

- adding a first portion of the sulfonating agent to the lignin-containing aqueous suspension heated at a first temperature in one or more addition steps to obtain a first mixture,
- stirring the first mixture at the first temperature to obtain a second mixture,
- adding a remaining portion of the sulfonating agent to the second mixture in one or more addition steps.

In another optional aspect, the sulfonation step of the process comprises:

- adding a first portion of the sulfonating agent to the lignin-containing aqueous suspension heated at a first temperature in one or more addition steps to obtain a first mixture,
- stirring the first mixture at the first temperature to obtain a second mixture,
- heating the second mixture to a second temperature higher than the first temperature,
- stirring the second mixture at the second temperature to obtain a third mixture,
- adding a remaining portion of the sulfonating agent to the third mixture in one or more addition steps.

In another optional aspect, the process further comprises adjusting the pH of the sulfonated lignin-containing mixture after cooling, to reach a pH from about 8 to about 13.5.

In another optional aspect, the pH can be adjusted, after cooling, by addition of a base which can be the same or different than the base optionally used in the mixing and/or sulfonation steps.

In another optional aspect, the sulfonation comprises sulfonating aliphatic moieties of the lignin.

In another optional aspect, the process further comprises reducing the content of volatile organic compounds (VOCs) in the sulfonated lignin-containing mixture before or after the cooling.

In another optional aspect, the process further comprises a sulfite precipitation step before or after the cooling, to obtain a sulfite-free sulfonated lignin-containing mixture.

In another optional aspect, the process further comprises a drying step to obtain the sulfonated lignin in solid form (e.g. powder).

According to another aspect, there is provided a composition comprising a sulfonated lignin obtained by the process as defined herein.

According to another aspect, there is provided a powder comprising a sulfonated lignin obtained by the process as defined herein.

According to another aspect, there is provided the use of the composition or the powder as defined herein, as a dispersant and water reducer in concrete, grout, mortar, oil-well cement, cement board or gypsum manufacturing; as a dispersant in agricultural products, drilling fluids or coal slurries; as a binding agent in agricultural products or coal; or as a tanning agent.

According to another aspect, there is provided the use of the composition or the powder as defined herein, as a dispersant and water reducer in concrete, grout, mortar, oil-well cement or cement board.

According to another aspect, there is provided the use of the composition or the powder as defined herein, as a dispersant and water reducer in gypsum manufacturing.

According to another aspect, there is provided a dispersant formulation for concrete, grout, mortar, oil-well cement or cement board comprising the composition or the powder as defined herein. In an optional aspect, the dispersant formulation comprises at least one defoaming agent.

According to another aspect, there is provided a concrete, mortar or grout comprising a cementitious material, water, aggregates and/or sand and the dispersant formulation as defined herein.

The present description refers to several documents, the contents of which are hereby incorporated by reference in their entirety.

DETAILED DESCRIPTION

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundary of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

It is to be understood that the phraseology and terminology employed in the present description is not to be construed as limiting and are for descriptive purposes only.

Furthermore, it is to be understood that the technology can be carried out or practiced in various ways and that it can be implemented in embodiments other than the ones outlined described herein.

Meanings of technical and scientific terms used herein are to be commonly understood as by one of ordinary skill in the art to which the invention belongs, unless otherwise defined.

The present technology can be implemented in the testing or practice with methods and materials equivalent or similar to those described herein.

The present technology thus provides a process for preparing sulfonated lignin-containing compositions in mild conditions, with simple steps, and which does not require costly purification steps.

Preliminary work has shown that most of the commercial Kraft lignins were difficult to solubilize at pH lower than 11. However, interesting dispersion potential was observed for the unmodified commercial Kraft lignins. A proposed solution to increase the lignin dispersion potential was to provide minimal charge increases on the lignin, while limiting and/or preventing further degradation or modification of the lignin. Sulfonation of the lignin using a sulfite source in mild conditions was thus investigated as such a solution.

A uniform suspension of fine lignin particles was prepared, and the sulfite source was added to the lignin suspension, at a reaction pH below 11, and a temperature of about 40° C. In the minutes after the sulfite source was added to the lignin suspension, the formation of agglomerates was observed. A subsequent heating step to the desired sulfonation temperature did not help as agglomerates were still present.

These agglomerates were observed even using pure Kraft lignins extracted through the LignoForce™ and LignoBoost™ processes, using sodium sulfite and sodium metabisulfite as sulfonation agents. Despite a wide range of conditions and approaches tested, agglomerates always appeared to generate at the onset of the sulfonation reaction. The agglomerates were noticeably more frequent and longer lasting in pH conditions approaching neutrality and at higher concentration levels, conditions that are otherwise favorable.

Though the agglomerates, often resulting in large masses occupying most of the reactor space, can solubilize again through time and provide polymers with proper performances, their presence in intermediate steps prevent scalability at a high solids content in larger reactors.

Hence, the process herein proposed, and as described in detail below, addresses those issues.

The proposed process includes in a first step, the preparation of a lignin-containing aqueous suspension with a solids content of up to about 45 wt % and a pH greater than about 6, by mixing at least one lignin with water, optionally in the presence of a base. In the next step, the lignin-containing aqueous suspension can be heated to a temperature of at least about 65° C. and up to about 160° C. under stirring. Then, the lignin is sulfonated by adding a sulfonating agent generating a sulfite ion, a bisulfite ion or a mixture thereof to the heated lignin-containing aqueous suspension. The sulfonation step can be performed under stirring at a sulfonation temperature of at least about 90° C. and up to about 160° C., at a sulfonation pH of from about 6 to about 11. The molar ratio of the sulfonating agent to the lignin can be between about 0.1:1 to about 1.5:1 on a sulfite to monomeric lignin sub-unit basis. After the sulfonation step, the sulfonated lignin-containing mixture can be cooled.

The process can be performed in a vessel or reactor at a pressure between atmospheric pressure and about 100 psi. In some embodiments, the heating step and/or the sulfonation step of the process can be carried out under reflux at atmospheric pressure. Alternatively, some of these steps can be performed in a pressure resistant reactor, wherein the reaction pressure that is observed is primarily that of the theoretical water saturation pressure at the reaction temperature. For example, at 110° C., the reaction pressure can be about 20 psi. At 120° C., the pressure can be about 30 psi. At 150° C., the reaction pressure can be about 70 psi.

The various steps of the process will now be described in more details.

Preparation of the Lignin-Containing Aqueous Suspension

In one embodiment, the lignin-containing aqueous suspension can be prepared by mixing at least one lignin with water under stirring, in any type of vessel or reactor known in the field, adapted to perform the process at a pressure between atmospheric pressure and about 100 psi. While the process will generally be described below mentioning the use of a single type of lignin, the use of two or more types of lignin is also contemplated. In some embodiments, the present process can be performed using any types of lignin, for instance those extracted through Kraft, soda, hydrolysis or solvolysis processes, or using partially or fully modified lignins. Modified lignins that can be used in the process can include reduced, oxidized, graft-modified or alkoxylated lignins, to name a few examples.

In some embodiments, the lignin-containing aqueous suspension can be prepared by mixing a Kraft lignin or soda lignin with water. The use of a mixture of Kraft and soda lignins is also contemplated. Moreover, the process can use more than one Kraft lignin or more than one soda lignin.

A "Kraft" lignin as used in the present process refers to a lignin extracted from the black liquor resulting from the Kraft pulping process. In the Kraft process, sodium hydroxide and sodium sulfide are used in cooking the fibrous plants in pressurized reactors, at temperatures reaching 160-180° C. and at a pH above 12, generating a degraded and solubilized lignin in an aqueous black liquor phase, also containing other components, including carbohydrates and inorganic salts. The black liquor phase is then separated from the solid-containing cellulosic phase (the pulp). Kraft lignin can be precipitated from the black liquor produced in the pulping stage of the Kraft process, prior to or after concentrating the black liquor or prior to its reintroduction in earlier pulping stages or to the feeding of the recovery boiler.

A "soda" lignin as used in the present process refers to a lignin extracted from the black liquor resulting from the soda pulping process. In the soda process, sodium hydroxide is used in cooking the fibrous plants in pressurized reactors, at 140-170° C. The process separates the lignin from the cellulosic materials, generating a degraded and solubilized lignin in an aqueous black liquor phase, also containing other components. The black liquor phase is separated from the solid-containing cellulosic phase (the pulp). Soda lignin can be precipitated from the black liquor. About 10% of the total chemical pulp produced is non-wood based. For these, soda pulping is the predominant method of pulping.

In some embodiments, the Kraft or soda lignin that can be used to make the sulfonated lignin-containing composition can be extracted from the black liquor derived from wood species, such as from softwood or hardwood. These lignins can be referred to as "softwood Kraft lignin" and "softwood soda lignin" when derived from softwood, or "hardwood Kraft lignin" and "hardwood soda lignin" when derived from hardwood. In an alternative embodiment, the Kraft or soda lignin can be extracted from the black liquor derived from a non-wood agricultural species, such as from cereal plants (e.g. wheat straw, corn stover, etc.). These lignins extracted from non-wood species, are referred to as "agricultural Kraft lignin" and "agricultural soda lignin" in the present description.

In some embodiments, the hardwood Kraft or hardwood soda lignin can be extracted from the black liquor derived from the following hardwood species: poplar, elm, birch, beech, maple or *Eucalyptus*, to name a few examples. Depending on the geographical region, other native hardwood species can also be used.

In other embodiments, the softwood Kraft or softwood soda lignin can be extracted from the black liquor derived from the following softwood species: spruces (black, white, red, Sitka and Engelmann), pines (jack, lodgepole, *Ponderosa*), firs (Douglas, silver, Basalm), hemlocks, cedars or tamarack, to name a few examples. Depending on the geographical region, other native softwood species can also be used.

When the agricultural Kraft or agricultural soda lignin is extracted from the black liquor derived from non-wood agricultural species, these agricultural species can include corn stover, wheat straw, switchgrass, kenaf and bamboo, to name a few examples. Depending on the geographical region, other native non-wood species can also be used.

In some embodiments, the lignin used to prepare the sulfonated lignin can be a purified lignin. In some embodiments, a "purified lignin" can refer to a lignin extracted from a black liquor that has undergone a pre-oxidation step before acidification to reduce volatile organic components. Other examples of processes for obtaining a "purified lignin" can include optimized filtration strategies aiming to reach better physical separation or washing of the precipitated lignin from the black liquor. Typically, such purification strategies are geared to reduce or control the non-lignin constituents, while keeping the nature of the lignin material substantially unchanged from that typically present in the black liquor. The "purified lignin" can be a lignin with a reduced hem icellulose or sugar content. In some embodiments, the purified lignin can be a softwood or hardwood Kraft lignin extracted through the Westvaco™ (see e.g. U.S. Pat. No. 2,623,040), LignoBoost® (see e.g. U.S. Pat. No. 8,172,981), or LignoForce™ (see e.g. U.S. Pat. No. 9,091,023) processes or similar processes.

In some embodiments, the purified lignin that can be used in the present process can be characterized by a post purification pH of from about 1 to about 10. In particular embodiments, the purified lignin can have a post purification pH of from about 1 to about 5, or from about 5 to about 10.

A non-exhaustive list of commercial lignins that can be used in the present process include Biochoice™ Lignin (Domtar), West Fraser Lignin Type A (West Fraser), West Fraser Lignin Type B (West Fraser), Indulin™ A (Ingevity), Lineo™ Lignin (Stora Enso) and New Products 101 and 102 (Suzano).

The lignin to be used is typically supplied as a solid product with a solids content between 40% and 100%, depending on whether a drying step was used in the purification process, and may be used as is. The lignin can be mixed with the water in the form of a powder, a cake or a mixture thereof, to prepare the lignin-containing aqueous suspension. If the lignin is used in the form of a cake, the cake should preferably be exempt from significant chunks of solidified masses. A large mesh sieve (e.g. meshes of a few inches width) can be used to break apart coarse agglomerates if needed. The preparation of the lignin suspension can be made either by addition of the lignin to the water, addition of water to the lignin in the reaction vessel, or alternate additions of water and lignin. Addition of the lignin to the vessel can be performed through any physical transfer technique (e.g. belt or screw conveyor). The mixing of the lignin with water can be performed at room temperature. As an alternative, hot water, or even fresh (and still warm) lignin cake can be used to prepare the suspension. In some embodiments, the lignin can be mixed with water at a temperature from about 3° C. to about 80° C.

The quantity of lignin and water for preparing the lignin-containing aqueous suspension can be selected such that the solids content of the lignin-containing aqueous suspension is at most about 45 wt % based on the total weight of the suspension. The solids content can be at maximum about 45 wt % to limit the viscosity of the suspension. In some embodiments, the solids content of the aqueous lignin suspension can range from about 15 wt % to about 45 wt %, or even from about 30 wt % to about 45 wt %.

The "solids content" of any solution, mixture, suspension, as used herein, refers to the solids content or dry matter content. The solids content includes both the suspended solids and dissolved solids in the solution, mixture, suspension. The total solids content is expressed as a ratio of weights obtained before and after drying and/or solvent (e.g. water) evaporation.

The pH of the lignin-containing aqueous suspension, i.e. before sulfonation, is advantageously greater than about 6. In some implementations, the pH of the lignin-containing aqueous suspension can range from about 6 to about 12. In other embodiments, the pH of the aqueous lignin suspension before addition of the sulfonation agent can be higher than the sulfonation pH.

Depending on the lignin used, the pH of the lignin-containing aqueous suspension can vary. For instance, depending on the extraction treatment, the pH of the lignin can be any value between about 1 and about 10. Therefore, in some embodiments, a base can be used to reach the desired pH in the aqueous lignin-containing suspension, i.e. a pH greater than about 6, or from about 6 to about 12. If, in some embodiments, a base is required to adjust the pH of the suspension, this base can be chosen from a metal hydroxide, a metal bicarbonate, metal carbonate, $NH_4OH$ or a mixture thereof. For instance, the base can be NaOH, KOH, $NaHCO_3$, $Na_2CO_3$, $KHCO_3$, $K_2CO_3$, $NH_4OH$ or any mixture thereof. In preferred embodiments, the base can be NaOH. The base can be used in solution in water at various concentrations. The amount of base to be used can be determined to corelate to a specific desired pH.

The base can be added to the water prior to mixing with the lignin or can be added to the suspension containing the lignin and water. Alternatively, the lignin can be added to the base in solution. The pH of the lignin-containing suspension can be monitored if desired, using common techniques to measure the pH of a liquid (e.g. electronic pH meter). Once prepared, the lignin suspension (base adjusted or not) can be keep for a while before being used in the next steps.

In some implementations, the preparation of the lignin-containing aqueous suspension can be performed in the presence of at least one surface-active agent. In some implementations, such as when addition of the lignin to the water is performed at lower mixing speeds for instance, the use of surface-active agent can prevent or limit the formation of a foam at the surface of the suspension. In some implementations, the surface-active agent can first be added to the water and then the lignin is added to the resulting water solution. The surface-active agent can be any wetting agent, defoaming agent or surfactant known in the art. In some implementations, the surface-active agent can be suitably selected not only for preventing foaming of the suspension of the lignin at the step of preparing the lignin-containing aqueous suspension, but also to serve as the defoaming agent in the final dispersant formulation that can be used in concrete mixes for instance. In this manner, the same surface-active agent can serve to prevent foaming of the lignin suspension in the first step of the process and can serve as an efficient defoaming agent in concrete mixes.

In further implementations, the preparation of the lignin-containing aqueous suspension can also be performed under heating at a relatively low temperature, such as between about 35° C. and about 70° C., e.g., at about 40° C. Smoothly heating the lignin aqueous suspension can allow reducing the viscosity of the mixture during the pH adjustment of the lignin suspension, if desired.

Various type of vessels or reactors can be used to mix the lignin with water and optionally the base, to prepare the lignin suspension. The reactor can be designed or chosen to ensure that the lignin suspension that is generated does not include or only includes a very limited quantity of agglomerates and that insoluble portions of lignin do not settle in the reactor vessel, before carrying out the heating and sulfonation steps of the process. To that end, any reactor and impeller design targeting a speed and shear rate high enough to break apart the initial lignin and prevent sedimentation can be suitable. For instance, the following systems can be used for obtaining a suitable aqueous lignin suspension: impellers including impellers and blades aimed at radial, axial flow or both. The impellers can be top-entering impellers (straight, angled and/or off-centre impellers), anchor type impellers (standard or helical) with or without reactor scrapping devices (ex. spring loaded or flexible material scrappers), or side-entering impellers which can be used alone or conjointly with a top-entering impeller. In some implementations, reactor baffles of adapted baffle size can be used.

The above described systems should typically be enough to obtain a suitable lignin suspension. If necessary, in some implementations, one could use other systems such as jet mixers for continuously recycling of the material inside the reactor (e.g. bottom to top) through the use of an external pump. Moreover, a draft tube with an internal top-impeller and an upwards or downwards flow could also be used. In further implementations, for instance if lignin agglomerates remain in the suspension before performing the next steps of the process, high-shear mixing can be used to favorize breakage of the agglomerates.

Heating the Lignin-Containing Aqueous Suspension

Once the lignin-containing suspension has been prepared with the desired solids content and pH, the suspension can be heated in the next step, and before sulfonation, to reach a temperature at least about 65° C. and up to about 160° C. The heating can be performed under stirring in the vessel where the suspension was prepared, or in at least one supplementary vessel.

In some embodiments, the lignin-containing aqueous suspension can be heated to a temperature of at least about 65° C. and less than 160° C. In other embodiments, the lignin-containing aqueous suspension can be heated to a temperature from about 80° C. to about 140° C., or from about 65° C. to about 140° C., or about 65° C. to about 95° C., or from about 70° C. to about 95° C., or from about 75° C. to about 95° C., or from about 80° C. to about 95° C., before the sulfonation. In other embodiments, the lignin-containing aqueous suspension can be heated to a temperature from about 70° C. to about 90° C., or from about 75° C. to about 90° C., or from about 80° C. to about 90° C., before the sulfonation. In further embodiments, the lignin-containing aqueous suspension can be heated to a temperature from about 85° C. to about 95° C., or from about 90° C. to about 95° C., before the sulfonation. For some implementations, the temperature at which the lignin-containing aqueous suspension is heated, before sulfonation, can range from about 80° C. to about 85° C., or from about 85° C. to about 90° C.

Through heating the lignin-containing aqueous suspension to at least about 65° C., the lignin can partially solubilize in the water until reaching a suitable solubility degree at which agglomeration of the lignin particles remaining in suspension can be limited or avoided. Limiting or avoiding agglomeration of the lignin particles can in turn allow increased accessibility of the reactive groups on the lignin aliphatic moieties, which will react with the sulfonating agent in the next step. Hence, limiting or avoiding agglomeration of the lignin particles can impact the sulfonation degree and kinetics of the lignin in the next step, which can both be increased. It is worth noting that in addition to heating, the stirring of the lignin suspension can further enhance the dispersion of the lignin particles to some extent.

In some implementations, the benefit of the heating step on limiting agglomeration of the lignin particles can be observed as soon as the suspension has reached the targeted heating temperature (e.g. at least 65° C.). In some embodiments, the suspension can be heated for a certain period, for example a few minutes, to ensure that there is no or substantially no agglomeration. Further advantages of the heating step will also be described below in connection with the sulfonation step.

The prior sulfonation heating step does not substantially impact the pH of the suspension.

Sulfonation of the Lignin

Once the lignin-containing suspension has been heated, a sulfonating agent is added to the heated lignin-containing aqueous suspension. The purpose of adding the sulfonating agent is to sulfonate the sulfonatable groups of the lignin and therefore form a sulfonated lignin product. By "sulfonatable" groups of the lignin, one refers to the chemical groups of the lignin that can react with the sulfonating agent to form sulfonate groups on the lignin. The sulfonatable groups can thus include alkenes and aliphatic sites adjacent of in proximity to hydroxyl groups, thiols, mercaptans, ethers, thioethers, etc. In some embodiments, the sulfonation can be performed by adding the sulfonating agent directly in the heated lignin-containing aqueous suspension, in the same vessel that was used to prepare the initial lignin aqueous suspension. Alternatively, the heated lignin-containing aqueous suspension can be transferred to at least one supplementary vessel prior to the addition of the sulfonating agent. The reaction can be performed under stirring. The addition of the sulfonating agent can be performed in one or more addition steps.

In some embodiments, the sulfonation step can include adding the sulfonating agent to the heated lignin-containing aqueous suspension, in solid form, in suspension, in solution, or as a gas.

The sulfonating agent is selected to generate a sulfite ion, a bisulfite ion or a mixture of sulfite and bisulfite ions in the heated aqueous lignin suspension. In some embodiments, the sulfonating agent can be selected from gaseous sulfur dioxide ($SO_2$), sodium sulfite, potassium sulfite, sodium bisulfite, potassium bisulfite, sodium metabisulfite, potassium metabisulfite and mixtures thereof. Sodium sulfite, sodium bisulfite, sodium metabisulfite or mixtures thereof can be preferably used as sulfonating agent, in some embodiments.

The sulfonating agent can be added to the heated lignin-containing aqueous suspension in a molar ratio of the sulfonating agent to the lignin ranging from about 0.1:1 to about 1.5:1. The molar ratio of the sulfonating agent to the lignin is expressed on a sulfite to monomeric lignin sub-unit basis, meaning that the molar ratio is based on the molar ratio of sulfite anions to monomeric lignin sub-units. In some embodiments, the molar ratio of the sulfonating agent to the lignin can be between about 0.1:1 to about 0.6:1 on a sulfite to monomeric lignin sub-unit basis. In another embodiment, the molar ratio of the sulfonating agent to the lignin can be between about 0.15:1 to about 0.3:1 on a sulfite to monomeric lignin sub-unit basis. "Monomeric lignin sub-unit" is understood to refer to the average monolignol subunit present in the polymeric lignin and is meant to include all chemical and structural variants typically derived from individual monolignols by biological processes, chemical pulping, extraction or purification processes.

Additional benefit of the prior heating step can be observed upon addition of the sulfonating agent to the lignin-containing suspension. Indeed, the addition of the sulfonating agent after the heating step, which can allow the lignin containing mixture to first achieve higher, but still incomplete, solubility at a higher temperature, results in little to no agglomerate forming upon addition of the sulfonating agent. Limited to no agglomeration is observed in such condition in a subsequent period of mixing the suspension containing the sulfonating agent or heating to the desired sulfonation temperature.

In contrast, if there is no prior heating step of the lignin-containing aqueous suspension, large agglomerates can form in the reaction vessel, either upon addition of the sulfonating agent or during a subsequent heating step to achieve the desired sulfonation temperature. Higher solids content (above 20 wt %) and lower reaction pH (below 10) further increase the formation and size of agglomerates. In the most problematic scenarios, a single agglomerated mass can often occupy the entire vessel. This phenomenon is observed even in the presence of baffles and stirring speeds upwards of 600 rpm, and it can take from several minutes to several hours before the agglomerates resorb.

The present process, thanks to the heating step carried out before addition of the sulfonating agent, can allow avoiding the above described problems.

The sulfonation is advantageously performed under heating and can be performed in the same vessel as that used for the addition of the sulfonating agent, or in at least one supplementary vessel. The sulfonation can also be performed as part of a continuous process. In some embodiments, the sulfonation temperature can be at least about 90° C. and up to about 160° C. In other embodiments, the sulfonation temperature can range from about 95° C. to about 130° C. In alternative embodiments, the sulfonation can be performed at a temperature ranging from about 100° C. to about 130° C., or from about 100° C. and 120° C. In some embodiments, the sulfonation temperature can be more than 100° C. Therefore, the sulfonation temperature can be at least 101° C., 102° C., 103° C., 104° C., 105° C., 106° C., 107° C., 108° C., 109° C., or 110° C. The sulfonation temperature can be from 105° C. to about 160° C., or from 105° C. to about 150° C., or from 105° C. to about 140° C., or from 105° C. to about 130° C., or from 105° C. to about 120° C., or from 105° C. to about 125° C., or from about 110° C. to about 120° C., or from about 110° C. to about 125° C., or from or from 115° C. to about 125° C. Performing the sulfonation step a high temperature can further prevent agglomerations from forming during or in the period following the addition of the sulfonation agent.

During the sulfonation step, the solids content of the lignin-containing aqueous suspension can be maintained at about 20 wt % to about 45 wt %. In some embodiments, the solids content of the lignin-containing aqueous suspension can be maintained at about 30 wt % to about 45 wt %, during the sulfonation. In some embodiments, additional water can be added to the mixture during the sulfonation step, to adjust the solids content. Addition of water can also allow adjusting the sulfonation temperature.

The sulfonation step can be performed at a sulfonation pH ranging from about 6 to about 11. In some embodiments, the pH of the reaction mixture during the sulfonation can be from about 6.5 to about 11. In other embodiments, the sulfonation pH can range from about 6.5 to about 10.5. In further embodiments, the sulfonation pH can be from about 8.5 to about 10.5. According to some embodiments, the pH of the lignin-containing aqueous suspension during sulfonation can be lower than the pH of the lignin-containing aqueous suspension before addition of the sulfonating agent.

It can be possible to monitor the pH of the reaction mixture during the sulfonation step to ensure that it can be maintained in a range from about 6 to about 11, or from about 6.5 to about 11, or from about 6 to about 10.5, or from about 6.5 to about 10.5, or from about 8.5 to about 10.5. In some embodiments, if the pH is too low, additional base can be added to the reaction mixture during sulfonation to increase the pH. In some embodiments, the addition of more base solution during sulfonation, to adjust the sulfonation pH, can also allow adjusting the sulfonation temperature.

The pH of the mixture can be impacted by the addition of the sulfonating agent, depending on the choice of sulfonating agent added. In some embodiments, it can be desired to adjust the pH and the solids content of the reaction mixture during sulfonation. This can be performed through addition of more water and base to the reaction mixture. The further addition of water can in turn allow adjustment of the sulfonation temperature.

Depending on the lignin raw material source, one can also observe different behavior with respect to agglomeration of the lignin particles, during or after the addition of the sulfonating agent. If a lignin type appears to agglomerate more than another one, it can be advantageous to add further water to increase dilution or to add further base to increase the pH, while staying within the above-mentioned solids content and pH ranges, to move the process back towards desirable agglomeration-free conditions.

In further embodiments, the sulfonation step can be performed by addition of the sulfonating agent in more than one addition step. Hence, the sulfonating agent can be added to the lignin-containing aqueous suspension in more than one portion. In some implementations, the sulfonation step can involve addition of a first portion of the sulfonating agent to the lignin-containing aqueous suspension heated at a first temperature to obtain a first mixture comprising the sulfonating agent and the lignin. The addition of the sulfonating agent can be performed in one or more addition steps. Then, the first mixture can be stirred at the first temperature to obtain a second mixture containing a partially sulfonated lignin. In some implementations, the stirring at the first temperature can be carried out for up to about 90 minutes, but this period of time can be adjusted. The remaining portion of the sulfonating agent can then be added to the second mixture in one or more addition steps, to obtain the desired sulfonated lignin composition. In other implementations, the sulfonation step can include addition of a first portion of the sulfonating agent at a first temperature and at least one further portion at a second temperature that is higher than the first temperature. Therefore, in such implementations, the first portion of the sulfonating agent is added in one or more addition steps to the lignin-containing aqueous suspension which is heated at a first temperature. This results in a first mixture, which is then stirred at the first temperature to obtain a second mixture containing a partially sulfonated lignin. In some implementations, the stirring at the first temperature can be carried out for up to about 90 minutes, but this period of time can be adjusted. The second mixture can then be heated at a second temperature higher than the first temperature and then stirred at the second temperature to form a third mixture. The lignin in the third mixture is thus further sulfonated compared to the partially sulfonated lignin in the second mixture. In some implementations, the stirring at the second temperature can be performed for up to about 90 minutes, however this period of time can be adjusted. In some implementations, the stirring at the first temperature can be performed for a period of time that is the same or different than the period of time during which the stirring at the second temperature is performed. Then, the remaining portion of the sulfonating agent can be added to the second mixture in one or more addition steps, at the second temperature, to obtain the desired sulfonated lignin composition. In some implementations, the first temperature can be from about 80° C. to about 95° C. In some implementations, the second temperature can be about 10° C. to about 30° C. higher than the first temperature. In other implementations, the first temperature can be from about 80° C. to about 95° C. and the second temperature can be from about 90° C. to about 105° C. In some implementations, the addition of the different portions of the sulfonating agent can be followed by an adjustment of the sulfonation temperature, solids content and/or pH of the solution. The sulfonation pH and the solids content can be adjusted by addition of water and/or base. In some implementations, the stepwise addition of the sulfonating agent can enhance the solubility of the lignin material, which can be impacted upon modification of the reaction pH, following the addition of the sulfonating agent. The time period between each addition, during which the reaction mixture is stirred at the first or second temperature, can further serve to gradually improve the solubility of the lignin in suspension. This, in turn, can reduce the impact of the subsequent additions on the viscosity/presence of agglomerates in the reaction mixture, as the case may be.

In some embodiments, the sulfonation reaction can be carried out for at least about 1 hour. In other embodiments, the sulfonation reaction time can be between about 1 hour and about 12 hours. In some embodiments, the sulfonation reaction can last between about 5 hours and about 12 hours, or between about 2 hours to about 6 hours, or between about 3 hours to about 5 hours. It is to be understood that if the sulfonation reaction is performed in more than one sulfonating agent addition steps as explained above, the sulfonation reaction times include all these steps. In some implementations, it can be possible to collect a reaction mixture sample to measure the degree of charges in the sample and assess whether the reaction is completed. In some embodiments, the reaction time can also be adjusted to provide a sulfonated lignin-containing composition with a desirable viscosity. For instance, a longer reaction time can provide a product of adequate performance with a desirable viscosity. Nevertheless, shorter reaction time can still provide a product of adequate performance, but at a higher and less desirable viscosity. However, the viscosity can be further adjusted, if required, by adding water or increasing the pH to the final composition.

Upon addition of the sulfonating agent, reactive groups on the aliphatic moieties of the lignin (e.g. alkenes and aliphatic sites adjacent of in proximity to hydroxyl groups, thiols, mercaptans, ethers, thioethers, etc) can be reacted to form aliphatic sulfonate groups on the lignin. Aromatic moieties can also react with the sulfonating agent to a limited extent. However, the process conditions can allow primarily sulfonating the lignin aliphatic moieties. Indeed, as explained above, the process conditions before addition of the sulfonated agent allow for the lignin particles to be readily suspended in the water solution with no or substantially no agglomeration of the lignin particles. This, in turn, can allow a better accessibility to multiple regions of the lignin, increasing speed of sulfonation, and preventing further agglomerations upon addition of the sulfonating agent.

More specifically, the process conditions can increase accessibility of the sulfonatable groups on the aliphatic moieties of the lignin, which can then readily react with the sulfonating agent. In addition, the sulfonation conditions themselves, including for instance the high sulfonation temperature, can favorize the solubilization of the sulfonated lignin to an important extent, which in turn can improve reactivity of the sulfonatable groups on the aliphatic moieties towards sulfonation.

In some embodiments, the aromatic moieties of the lignin can be substantially unsulfonated, meaning that the sulfonating agent does not react or only reacts to a negligible extent with the aromatic moieties of the lignin. Since the aliphatic moieties of the lignin are rendered accessible thanks to the process conditions, such as the pre-sulfonation heating step and also the high temperature sulfonation, the sulfonating agent can react primarily with aliphatic moieties of the lignin and the aromatic moieties may not or substantially not react. Therefore, one can obtain an optimal sulfonation degree of the aliphatic moieties of the lignin, which will improve upon the unmodified lignin in terms of performance of the final composition as dispersant or water reducer in the various intended applications, as will be detailed below. The present process can thus allow introducing sulfonate functions on the aliphatic moieties of the lignin without requiring a step of functionalizing or graft polymerizing the lignin to introduce side chains containing reactive groups on the lignin, before sulfonation. For instance, the present process distinguishes from known sulfomethylation processes involving the use of formaldehyde followed by sulfite additions, in which the modifications are non-exclusive and both aromatic and aliphatic groups of the lignin are either sulfomethylated or sulfonated.

Cooling Step Post Sulfonation

After the sulfonation step of the process, the reaction mixture, containing the sulfonated lignin dispersed in water can be cooled to avoid or limit any decomposition of the sulfonated lignin. The resulting cooled sulfonated lignin-containing mixture could be used as is, meaning that a ready-to-use product can be obtained after the cooling step. However, as will be explained below, the cooled sulfonated lignin-containing mixture can also receive additional optional treatments.

In some embodiments, the sulfonated lignin-containing mixture can be cooled to a temperature below 80° C., at which decomposition of the sulfonated lignin can be avoided or limited. In particular embodiments, the sulfonated lignin-containing mixture can be cooled to a temperature below 70° C., or even below 65° C.

Various means can be used to cool the sulfonated lignin-containing mixture. For instance, one could use a cooling bath, in-reactor cooling coils or plates, cooling jackets or any other cooling method known in the field. In alternative or complementary embodiments, cooling can be performed by addition of water to the sulfonated lignin-containing mixture. Through addition of water to cool the mixture, one can also adjust the solids content and thus the viscosity of the composition. In some embodiments, water can be added to cool the sulfonated lignin-containing mixture and a cooled sulfonated lignin-containing mixture with a solids content of from about 20 wt % to about 45 wt % can be obtained. Therefore, by using water to cool the mixture during the cooling step, one can "customize" the composition for having a desired solids content and associated viscosity. For instance, one can adjust the solids content to reach a viscosity of less than about 1000 cP for obtaining a pumpable composition. However, the solids content and associated viscosity can be adjusted to any desirable value. The so-customized mixture can then be used directly, as is, for various applications, which will be detailed below.

Optional Additional Steps

As mentioned above, the sulfonated lignin-containing mixture obtained after the cooling step can be ready-to-use for some intended applications. However, in some embodiments, the sulfonated lignin-containing mixture can receive further additional treatments as will now be detailed.

In some embodiments, it can be desired to further adjust the pH of the sulfonated lignin-containing mixture after cooling. For instance, one can adjust the pH of the cooled sulfonated lignin-containing mixture to reach a pH from about 8 to about 13.5. In some embodiments, the pH of the cooled sulfonated lignin-containing mixture can be adjusted to reach a value from about 8 to about 13 when the cooled mixture is at a temperature below 80° C., or below 70° C., or even below 65° C. In some embodiments, the pH of the sulfonated lignin-containing mixture after cooling, can be adjusted to reach a pH from about 11 to about 13. Cooling the sulfonated lignin-containing mixture before adjustment of pH can prevent degradation of the product upon addition of a base, which can result in a decreased dispersing ability.

Adjustment of the pH of the sulfonated lignin-containing mixture, post-cooling, can be carried out by addition of a base which can be the same or different than the base optionally used in the mixing or sulfonation steps. The base used for adjusting the pH of the cooled sulfonated lignin-containing mixture can be chosen from a metal hydroxide, a metal bicarbonate, metal carbonate, $NH_4OH$ or a mixture thereof. For instance, the base can be NaOH, KOH, $NaHCO_3$, $Na_2CO_3$, $KHCO_3$, $K_2CO_3$, $NH_4OH$ or any mixture thereof. In preferred embodiments, the base used to adjust the pH of the cooled sulfonated lignin-containing mixture can be NaOH.

In some embodiments, the sulfonated lignin-containing mixture before cooling or post-cooling, can undergo further treatments, such as a treatment for reducing the content of volatile organic compounds (VOCs) in the sulfonated lignin-containing mixture. VOCs observed in the process product may include residual volatile sulfur-based compounds and terpenoids, in ppm or sub-ppm levels. This VOC-reducing step can allow obtaining a product presenting reduced odors.

In some embodiments, the reduction of the VOCs can be performed through gaz stripping or evaporation from the mixture, prior to or after the cooling step, or at any intermediate temperature. Alternatively, reduction of the VOCs can be done by bubbling an oxidative gas such as $O_2$ or air in the sulfonated lignin-containing mixture. In another embodiment, removal of the VOCs can include a treatment of the sulfonated lignin-containing mixture by a peroxide or ozone. In some embodiments, one can combine one or more of the above-described methods to reduce the VOCs content of the sulfonated lignin-containing mixture.

In further embodiments, the sulfonated lignin-containing mixture can undergo a treatment to remove residual sulfites therefrom. This can be beneficial for compatibility with certain additives (for example, additives which contain calcium salts). This treatment can involve precipitating the sulfites out of the sulfonated lignin-containing mixture, which can be performed either before or after the cooling step. A pH adjustment can be required as part of the precipitation step. With such a treatment, one can obtain a sulfite-free sulfonated lignin-containing mixture. In some embodiments, the sulfite precipitation can be performed by forming an insoluble sulfite salt by addition of salt or base to the sulfonated lignin-containing mixture. Then, a physical separation of the insoluble sulfite salt can be carried out to recover the sulfite-free sulfonated lignin-containing mixture. In some embodiments, the salt added to precipitate the sulfites can be calcium hydroxide or calcium oxide and the resulting insoluble sulfite salt is therefore calcium sulfite. The physical separation to remove the insoluble sulfite salt can be deposition or a filtration.

In further embodiments, the process can include an additional drying step to obtain the sulfonated lignin product in solid form, e.g. in powder form. While the sulfonated lignin-containing composition can directly be used as a solution in water, it can be advantageous, in some implementations, to dry the composition to recover a solid product. For instance, it can be easier to transport or stock a solid product since this would require less space. If a drying step is implemented, i.e. to remove water from the sulfonated lignin-containing mixture, this drying can be performed using any methods known in the field. For instance, one can dry the sulfonated lignin-containing mixture, which can be sulfite-free, using a spray dryer, spin flash dryer or drum dryer. Some VOCs which may be present in the mixture if no treatment was performed before to remove them, can be removed from the product during this drying step.

Sulfonated Lignin-Containing Composition and Use Thereof

The sulfonated lignin-containing composition resulting from the above described process can thus be in liquid form or in the form of a solid, such as powder. Both the liquid form and the solid form can have its own advantages. A liquid form can be used directly as is in the intended applications. With respect to the solid form, it can be mixed with water before being used. Alternatively, the solid form could be mixed with other solid additives and then the resulting mixture could be mixed with water for being used.

The sulfonated lignin-containing composition (liquid or solid) can include a sulfonated lignin with a sulfonation degree that can range from about 3% to about 15% of the lignin, on a weight basis. In other embodiments, the sulfonation degree can be of about 7% to about 12% of the lignin, on a weight basis, such as for softwood lignins.

In some embodiments, the sulfonated lignin-containing composition can include a sulfonated lignin characterized by an apparent charge density from about 0.8 to about 2.2 meq/g. In some embodiments, the charge density can be from about 1 to about 2 meq/g. The sulfonated lignin-containing composition can further have a viscosity lower than about 10000 cP. In some embodiments, the viscosity of the sulfonated lignin-containing composition can be less than about 1000 cP.

The sulfonated lignin-containing composition (liquid or solid) can be used for various applications, such as in the field of construction, oil extraction, agriculture, tanning, in coal-based products, to name a few examples.

In some embodiments, the sulfonated lignin-containing composition (liquid or solid) can be used as a dispersant and water reducer in concrete, grout, mortar, oil-well cement, cement board or gypsum manufacturing; as a dispersant in agricultural products, drilling fluids or coal slurries; as a binding agent in agricultural products or coal; or as a tanning agent.

In a particular embodiment, the sulfonated lignin-containing composition (liquid or solid) can be used as a dispersant and water reducer in concrete, grout, mortar, oil-well cement or cement board. In an alternative particular embodiment, the composition can be used as dispersant and water reducer in gypsum manufacturing.

Products Containing the Sulfonated Lignin

Various types of products can be prepared using the sulfonated lignin-containing composition prepared using the above described process. As mentioned above, the sulfonated lignin-containing composition, either in liquid form (solution in water) or in solid form (e.g., powder), can be used in many different applications. Hence, various products can be prepared containing the sulfonated lignin resulting from the process described herein. In some embodiments, a product useful in the field of construction can contain the sulfonated lignin.

In some embodiments, there is provided a dispersant formulation for concrete, grout, mortar, oil-well cement or cement board including the sulfonated lignin composition as described herein, in liquid form or solid form. The dispersant formulation itself can be in liquid form or solid form. In some embodiments, the dispersant formulation is in liquid form. The dispersant formulation for concrete, grout, mortar, oil-well cement or cement board can further include additional components. In some implementations, the dispersant formulation, in addition to the sulfonated lignin composition, can include different types of agents thereby forming a dispersant admixture that can be used in the making of concrete, grout, mortar, oil-well cement or cement board. The agents that can be added to the dispersant formulation to form the dispersant admixture can include an air-entraining agent, a water-reducing agent, a plasticizer, a superplasticizer, an accelerating agent, a retarding agent, a hydration-control agent, a corrosion inhibitor, a shrinkage reducing agent, an alkali-silica reactivity inhibitor, a coloring agent, a workability retention agent, a bonding agent, a dampproofing agent, a permeability reducing agent, a grouting agent, a gas-forming agent, an antiwashout agent, a viscosity modifying agent, a defoaming agent, a pumping aid or any mixture thereof. In some implementations, the dispersant formulation can include at least one defoaming agent, also referred to as air detraining or antifoaming agent, in addition to the sulfonated lignin composition. Hence, a dispersant admixture can include the sulfonated lignin composition as described herein and at least one defoaming agent.

In some implementations, the defoaming agent can be present in the sulfonated lignin composition resulting from the above described process. Indeed, as previously mentioned, the first step of the process to prepare the lignin-containing aqueous suspension can be performed in the presence of a surface-active agent, which can be a defoaming agent. In other implementations, the defoaming agent can be added to the composition containing the sulfonated lignin resulting from the process. Alternatively, one can prepare a dispersant formulation from a sulfonated lignin composition resulting from the process including a surface-active agent which is a first defoaming agent and adding a second defoaming agent to the dispersant formulation. The first and second defoaming agents could be the same or different.

In some implementations, the defoaming agents can include a polyethylene glycol (PEG)-based surfactant, a polypropylene glycol (PPG)-based surfactant, a PEG/PPG-based surfactant, a phosphate-based surfactant, a silicone-based surfactant, an amine-based surfactant or any mixture thereof. By "PEG", "PPG", "PEG/PPG", "phosphate", "silicone" or "amine"-based surfactant, one means that the surfactant can include PEG, PPG, both PEG and PPG, phosphate, silicone or amine chemical groups as a primary substructure but is not strictly limited to such chemical group. For example, a PEG-based surfactant can include a short/medium alkyl sidechain attached to the end of a PEG, and hence be "PEG-based".

In some embodiments, the dispersant formulation including the inventive sulfonated lignin composition can be used in a concrete, mortar or grout in adjunction to the cementitious material, water, aggregates and/or sand. While the cementitious material can be cement, such as Portland cement, in many applications, other types of cementitious material can alternatively or additionally be used in the concrete, mortar or grout. For instance, the cementitious material can include cement, fly ash, silica fumes, blast-furnace slags, natural or synthetic pozzolans, glass powder, limestone or any mixture thereof.

Moreover, the concrete, mortar or grout can further include any additional component known in the field to change and/or adapt its properties depending on the final application. Therefore, in some embodiments, the concrete, mortar or grout can further include at least one of an air-entraining admixture, a water-reducing admixture, a plasticizer, a superplasticizer, an accelerating admixture or a retarding admixture, a hydration-control admixture, a corrosion inhibitor, a shrinkage reducer, an alkali-silica reactivity inhibitor, a coloring admixture, a workability admixture, a bonding admixture, a dampproofing admixture, a permeability reducing admixture, a grouting admixture, a gas-forming admixture, an antiwashout admixture, a viscosity modifying admixture, and a pumping admixture.

The above described process can thus allow preparing interesting compositions composed of a functionalized lignin of low charge density. The products resulting from the present process present high dispersion efficiency. The process can thus allow producing dispersant compositions in mild conditions, without having to resort to over-functionalization (e.g. use of formaldehyde, oxidation or other). The process can result in a ready-to-use dispersant with high solids content, without requiring purification steps or only straightforward ones (e.g., VOC removal and/or sulfite precipitation). The ready-to-use dispersant is capable amongst many uses, of functioning as a low to mid-range dispersant in concrete, with minimal impact on setting time and an improved workability retention profile compared to current alternatives.

EXAMPLES

The following examples are provided to illustrate the technology described herein.

Example 1—According to the Present Process

Water (559.6 g) and aqueous sodium hydroxide (50% solution, 58.7 g) are added to a pressure-resistant vessel equipped with an agitator. Commercial Softwood Kraft Lignin (Domtar, 72.8% solids, 300 g on a dry basis) is added to the vessel. Stirring is started, and the resulting suspension (32% solids, pH 10.4) is brought to a temperature of 90° C. and stirred for 30 minutes. Sodium sulfite (73.5 g or 0.35 equivalent versus lignin on a sulfite ion basis, assuming a 180 g/mol for the lignin monomeric subunits) is added to the reaction vessel, followed by a closure and sealing of the vessel. The reaction mixture is brought to a sulfonation temperature of 120° C. (35.3% solids, pH 10.8) and maintained at 120° C. for 10 hours to provide a sulfonated lignin mixture. The sulfonated lignin mixture is then cooled to a temperature of 40° C.

Example 2—According to the Present Process

Water (507.7 g) and aqueous sodium hydroxide (50% solution, 74.0 g) are added to a pressure-resistant vessel equipped with an agitator. Commercial Softwood Kraft Lignin (West Fraser—Type A, 60.4% solids, 260 g on a dry basis) is added to the vessel. Stirring is started, and the resulting suspension (29% solids, pH 11.5) is brought to a temperature of 85° C. and stirred for one hour. Sodium metabisulfite (54.9 g or 0.4 equivalent versus lignin on a sulfite ion basis, assuming a 180 g/mol for the lignin monomeric subunits) is added to the reaction vessel, followed by a closure and sealing of the vessel. The reaction mixture is brought to a sulfonation temperature of 150° C. (31.6% solids, pH 10.0) and maintained at 150° C. for 6 hours to provide a sulfonated lignin mixture. The sulfonated lignin mixture is then cooled to a temperature of 40° C.

Example 3—According to the Present Process

The sulfonated lignin mixture from Example 2 is alternatively cooled to a temperature of 40° C. and the solution adjusted to pH 11.0 using aqueous sodium hydroxide.

Example 4—According to the Present Process

Water (591.1 g) and aqueous sodium hydroxide (50% solution, 27.6 g) are added to a pressure-resistant vessel equipped with an agitator. Commercial Softwood Kraft Lignin (West Fraser—Type B, 70.5% solids, 270 g on a dry basis) is added to the vessel. Stirring is started, and the resulting suspension (28% solids, pH 11.4) is brought to a temperature of 85° C. and stirred for 30 minutes. At this point, sodium metabisulfite (28.5 g or 0.2 equivalent versus lignin on a sulfite ion basis, assuming a 180 g/mol for the lignin monomeric subunits) is added to the reaction vessel, followed by a closure and sealing of the vessel. The reaction mixture is brought to a sulfonation temperature of 110° C. (30% solids, pH 9.7) and maintained at 110° C. for 9 hours to provide a sulfonated lignin mixture. The sulfonated lignin mixture is then cooled to a temperature of 40° C.

Example 5—According to the Present Process

Softwood Kraft Lignin (Lignoforce™ Resolute Lignin, 53.8% solids, 130 g on a dry basis) is added to a reaction vessel equipped with a condenser and mechanical agitator. Water (211.1 g) is added under constant stirring. To the resulting suspension, aqueous sodium hydroxide (50% solution, 31.2 g) is added. The suspension (32% solids, pH 11.3) is brought to a temperature of 90° C., at which point sodium metabisulfite (20.6 g or 0.30 equivalent versus lignin on a sulfite ion basis, assuming a 180 g/mol for the lignin monomeric subunits) is added to the reaction vessel. After 15 minutes of stirring, the reaction is brought to reflux at 100° C. (32% solids, pH 9.1) and maintained at 100° C. for 12 hours to provide a sulfonated lignin mixture. The mixture is then cooled to a temperature of 40° C. and the solution adjusted to pH 13.5 using aqueous sodium hydroxide (50%).

Example 6—According to the Present Process

Commercial Softwood Kraft Lignin (West Fraser—Type A, 60.4% solids, 90 g on a dry basis) is added to a reaction vessel equipped with a condenser and mechanical agitator. Water (187.9 g) is added under constant stirring. To the resulting suspension, aqueous potassium hydroxide (37% solution, 49.5 g) is added. The suspension (28% solids, pH 11.5) is brought to a temperature of 85° C., at which point sodium metabisulfite (16.6 g or 0.35 equivalent versus lignin on a sulfite ion basis, assuming a 180 g/mol for the lignin monomeric subunits) is added to the reaction vessel. After 15 minutes of stirring, the reaction is brought to reflux at 100° C. (29.5% solids, pH 10.2) and maintained at 100° C. for 12 hours to provide a sulfonated lignin mixture. The sulfonated lignin mixture is then cooled to a temperature of 40° C.

Example 7—Comparative

Commercial Softwood Kraft Lignin (West Fraser—Type A, 60.4% solids, 90 g on a dry basis) is added to a reaction vessel and stirred. At room temperature, water is added, and the pH is adjusted using aqueous sodium hydroxide (50% solution) to provide an aqueous Kraft lignin solution (12.65% solids, pH 11.0).

Example 8—Comparative

Commercial Softwood Kraft Lignin (West Fraser—Type A, 60.4% solids, 110 g on a dry basis) is added to a reaction vessel equipped with a condenser and mechanical agitator. Water (164.8 g) is added under constant stirring. To the resulting suspension, aqueous sodium hydroxide (50% solution, 30.3 g) is added. The suspension (33% solids, pH 11.7) is brought to a temperature of 40° C., at which point sodium metabisulfite (23.2 g or 0.40 equivalent versus lignin on a sulfite ion basis, assuming a 180 g/mol for the lignin monomeric subunits) is added to the reaction vessel. After 15 minutes of stirring, the reaction is brought to reflux at 100° C. (36% solids, pH 9.9) and maintained at 100° C. for 10 hours to provide a sulfonated lignin mixture.

The mixture is then cooled to a temperature of 75° C. and the solution adjusted to pH 11.1 using aqueous sodium hydroxide (50%) and diluted with water to 29.7% solids. The mixture is further cooled to room temperature.

Example 9—Comparative

Commercial Softwood Kraft Lignin (Domtar, 72.8% solids, 70 g on a dry basis) is added to a reaction vessel equipped with a condenser and mechanical agitator. Water (295.9 g) is added under constant stirring. To the resulting suspension, aqueous sodium hydroxide (50% solution, 1.6 g) is added. The suspension (18% solid, pH 11.0) is brought to a temperature of 90° C., at which point sodium metabisulfite (9.2 g or 0.25 equivalent versus lignin on a sulfite ion basis, assuming a 180 g/mol for the lignin monomeric subunits) is added to the reaction vessel. After 15 minutes of stirring, the reaction is brought to reflux at 100° C. (20% solids, pH 5.0) and maintained at 100° C. for 12 hours to provide a sulfonated lignin mixture.

The mixture is then cooled to a temperature of 25° C. and the solution adjusted to pH 11 using aqueous sodium hydroxide (50%). The resulting mixture is characterized by the presence of a significant deposit of insoluble material (supernatant: 16.8% solids).

Example 10—Comparative

Commercial Softwood Kraft Lignin (Domtar, 72.8% solids, 230 g on a dry basis) is added to a pressure-resistant vessel equipped with an agitator. Water (641.3 g) is added under constant stirring. To the resulting suspension, aqueous sodium hydroxide (50% solution, 32.7 g) is added. The suspension (25% solids, pH 10.1) is brought to a temperature of 85° C. and stirred for 30 minutes. Sodium metabisulfite (9.7 g or 0.08 equivalent versus lignin on a sulfite ion basis, assuming a 180 g/mol for the lignin monomeric subunits) is added to the reaction vessel. After 15 minutes of stirring, the reaction is brought to 130° C. (25% solids, pH 8.9) and maintained at 130° C. for 10 hours to provide a sulfonated lignin mixture. The sulfonated lignin mixture is then cooled to 60° C. and diluted with water to reach 19.6% solids.

EXAMPLE 11—COMPARATIVE

The sulfonated lignin mixture from Example 5 is alternatively cooled to a temperature of 95° C. and the solution adjusted to pH 12.8 using aqueous sodium hydroxide (50%). The mixture is further cooled to room temperature.

Example 12—Analysis of Process and Evaluation of Mortar Containing the Sulfonated Lignins The dispersing capability of the sulfonated lignins obtained through the present process was evaluated (Examples 1 to 6) and compared with unmodified lignin (Example 7) and sulfonated lignins obtained with other processes (Examples 8 to 11). Dispersing ability and impact on other parameters of concrete equivalent mortar were tested. The concrete equivalent mortar (CEM) test is a routine test performed using a mortar composed of a cement, sand, water and the additive to be tested, in this case each dispersant from Examples 1 to 11. From an initial reference concrete mix design, the coarse aggregates typically used are replaced by an additional quantity of sand presenting the same total surface area. The tests were performed using a general use cement provided by CRH, Joliette, Canada (representative chemical composition C3S: 61%, C2S: 12%, C3A: 7%, C4AF: 7%, Na2O eq: 0.87) and sand provided by Sables La-Ro, Canada.

A reference mortar was performed at a water:cement ratio of 0.54, using a mix design equivalent to 350 kg of cement and 1010 kg of coarse aggregates per cubic meter of concrete. The reference mortar provided 208±5 mm of spread 10 mins after initial cement/water contact. Workability retention was measured by taking spread measurements up to 60 minutes. Setting time was measured through semi-adiabatic calorimetric measurements, finding the inflection point on a mortar temperature profile through the onset of hydration. The results are presented in Table 1 below. Table 1 also presents the impact of the process conditions on the agglomeration of the lignin particles upon addition of the sulfonation agent.

Examples 1 to 11 were tested on a mortar composition as described above, using a water reduction (WR) of 7.5%, equivalent to a water:cement ratio of 0.50. Tert-butyl phosphate was used as an air-detraining agent on all samples to ensure a mortar with no air-entrainment would be obtained.

Examples 1 through 6 provided a significant improvement of dispersing ability over the unmodified lignin (Comparative Example 7). These six examples include selected conditions within the process herein described, as applied to four different lignin raw material sources. All setting times are lower than that of Example 7, and the workability retention is noticeably similar to the control mortar across all tests. Their required dosage of 0.25% (on a dry basis vs cement), versus 0.38% for Example 7, provide a 35% improvement in dispersibility.

TABLE 1

IMPACT ON AGGLOMERATIONS OF EXAMPLES 1 TO 11, AND DISPERSION PERFORMANCE ON MORTAR

| | Process conditions | | | | Performance in mortar; 7.5% WR, at dosage required to match spread of reference mortar at 10 minutes (208 ± 5 mm) | | Workability |
|---|---|---|---|---|---|---|---|
| | Sulfite ion:lignin molar ratio* | Sulfonation pH | Temperature pre-addition of sulfite | Observation upon addition of sulfonation agent | Required dosage (%) | Setting time (h) | retention at 60 min (% vs spread at 10 min) |
| Control (no dispersant, 0% WR) | — | — | — | — | — | 5.8 | 84% |
| Example 1 | 0.35 | 10.8 | 90° C. | o | 0.25% | 9.8 | 89% |
| Example 2 | 0.40 | 10.1 | 85° C. | o | 0.25% | 10.0 | 82% |
| Example 3 | 0.40 | 10.1 | 85° C. | o | 0.25% | 10.0 | 85% |
| Example 4 | 0.20 | 9.7 | 85° C. | o | 0.25% | 9.6 | 81% |
| Example 5 | 0.30 | 9.1 | 90° C. | o | 0.25% | 10.0 | 84% |
| Example 6 | 0.35 | 10.2 | 85° C. | o | 0.25% | 9.3 | 81% |
| Comparative Example 7 | — | — | — | — | 0.38% | 10.8 | 86% |
| Comparative Example 8 | 0.40 | 9.9 | 40° C. | ++ | 0.25% | 10.0 | 78% |
| Comparative Example 9 | 0.25 | 5.0 | 90° C. | + | 0.40% | 12.3 | 87% |
| Comparative Example 10 | 0.08 | 8.9 | 85° C. | o | 0.42% | 12.0 | 89% |
| Comparative Example 11 | 0.30 | 9.1 | 90° C. | o | 0.28% | 10.0 | 85% |

* sulfite ion to monomeric lignin sub-unit molar ratio
o: no agglomerates,
+: weak agglomerates,
++: strong agglomerates Using the process described herein, Examples 1 to 6 also showed no significant agglomerates upon heating the initial lignin containing mixture, or upon the addition of the sulfonating agent. In contrast, comparative Example 8 (lower temperature for addition of sulfonating agent) resulted in a single large agglomerated mass generated in the minutes following the addition of the sulfonating agent, despite otherwise similar conditions to previous examples. Therefore, these examples demonstrate that the inventive process provide a practical improvement in the prevention of agglomerate formation, at high solids content and mildly alkaline conditions.

Comparative examples 9 to 10 are provided to compare conditions outside of the present process and their impact on dispersion potential. Examples 9 and 10 demonstrate the impact of an improper sulfonation reaction pH (below 6) or improper sulfonation sulfite ratio (below 0.1) respectively, on the dispersing ability of the resulting sulfonated lignin. They resulted in a required dosage of 0.40% and 0.42% to achieve the desired initial dispersion.

Comparative example 11 further shows the impact of a highly alkaline pH adjustment at a temperature of 95° C. At this temperature and high pH, a degradation of the performance can be observed (versus example 5, which is adjusted to a higher pH, but at a lower temperature of 40° C.), requiring an increase to 0.28% in dosage for an equivalent performance. The benefits of a lowered viscosity at a higher pH are therefore understood to be best achieved through a pH adjustment at lower temperatures, to minimize potential impacts on dispersion performance.

Example 13—Analysis and Comparison of Dispersion Performance on Concrete Versus Other Dispersants The dispersants obtained by the inventive process were evaluated and compared to commercial dispersants using concrete tests. The concrete tests were performed in a three cubic feet concrete mixer, using a concrete comprising cement, sand, coarse aggregates, water and the additive to be tested, in this case the dispersants from Examples 1 and 2 and commercial alternatives. The raw material used included a general use cement provided by CRH, Joliette, Canada (representative chemical composition C3S: 61%, C2S: 12%, C3A: 7%, C4AF: 7%, Na2O eq: 0.87), concrete sand provided by Sables La-Ro, Canada, and coarse aggregates of size 2.5-20 mm provided by Carrière Acton Vale ltée, Acton Vale, Canada.

A reference concrete was performed at a water:cement ratio of 0.62, using a mix design comprising 307 kg of cement and 1010 kg of coarse aggregates per cubic meter of concrete. The reference concrete provided 100-115 mm of slump 10 mins after initial cement/water contact (norm ASTM C494-15a). Workability retention was measured by taking slump measurements up to 30 minutes. Setting time was measured through penetration measurements (norm ASTM C403-08).

The results are presented in Table 2 below.

Examples 1 and 2 were tested on a concrete as described above in two distinct conditions, first using a WR of 6.5% and then using a WR of 10%, equivalent to water:cement ratios of 0.58 and 0.56, respectively. The WR of 6.5% is at the lower end of a mid-range application (used herein to evaluate low range applications), while the WR of 10% is used to evaluate mid-range applications. Four commercial alternatives were tested using the same approach. Representatives of the families of PNS (Disal®, Ruetgers Polymers), PCE (Megapol MP®, Ruetgers Polymers), commercial low range (LR) lignosulfonates (Norlig™ 58A, Borregaard) and commercial medium range (MR) lignosulfonates (Eucon® MRC, Euclid Chemicals). When required, tert-butyl phosphate was used as an air-detraining agent on samples to ensure a concrete with a controlled air-entrainment would be obtained (about 1.5%).

At both WR levels, Examples 1 and 2 show significant improvements on the required dosage to achieve the same initial dispersion as the control concrete, when compared to PNS, LR and MR lignosulfonates. Only the PCE show a lower dosage requirement, however typically accompanied by a much higher dispersant cost. The compressive strengths of Examples 1 and 2 were similar to that of a PNS and provided an increase from the control (0% WR) as required by norm ASTM C494.

TABLE 2

DISPERSION PERFORMANCE ON CONCRETE AND COMPARISON TO COMMERCIAL ALTERNATIVES

| | Performance in concrete; 6.5% WR, at dosage required to match reference concrete | | | | Performance in concrete; 10% WR, at dosage required to match reference concrete | | | |
|---|---|---|---|---|---|---|---|---|
| | Required dosage (% vs cement) | Initial setting time (h) | Workability retention at 30 min (% vs initial slump) | Compressive strenght 7 days (Mpa) | Required dosage (% vs Cement) | Initial setting time (h) | Workability retention at 30 min (% vs initial slump) | Compressive strenght 7 days (Mpa) |
| Control (no dispersant, 0% WR) | none | 5.1 | 83% | 27 | none | 5.1 | 83% | 27 |
| Example 1 | 0.18% | 5.5 | 70% | 33 | 0.38% | 8.4 | 70% | 32 |
| Example 2 | 0.18% | 5.5 | 70% | 31 | 0.38% | 8.4 | 73% | 33 |
| Commercial PNS - Disal ® | 0.24% | 5.2 | 64% | 30 | 0.44% | 5.3 | 50% | 33 |
| Commercial PCE - Megapol ® MP | 0.07% | 5.5 | 63% | 31 | 0.10% | 6.0 | 50% | 35 |
| Commercial LR Lignosulfonate | 0.25% | 9 | 48% | 33 | 0.58% | >24 | 42% | 36 |
| Commercial MR Lignosulfonate | 0.50% | 8.8 | 57% | 33 | 1.00% | 18.5 | 52% | 39 |

From the results provided in Table 2, one can note the excellent workability retention of the presented examples, compared to all commercial alternatives, at both WR levels. The data show, especially at a higher reduction, that the use of the present process results in a ready-to-use dispersant presenting an improvement on the current industry standards in terms of workability retention. Such improvements can result in less required adjustments of fluidity once a concrete truck reaches a worksite, and further reduction in total dosage and cost. They also further reduce the risk of over-dosing a dispersant and seeing the concrete load being rejected.

In terms of impact on setting time, Examples 1 and 2 showed at WR 6.5%, an impact similar to PNS and PCE and an improvement on commercial lignosulfonates. At 10% WR, a slight increase in setting time of about 3 hours was observed for Examples 1 and 2 compared to PNS and PCE. However, Examples 1 and 2 show major improvements on the setting times compared to current commercial lignosulfonates in similar MRWR conditions.

Collectively, these results convey that the sulfonated lignin-containing compositions resulting from the present process provide dispersing capabilities different from other current industry standards. By achieving dispersibility at lower dosages, despite low charge density (see Example 14), they can provide an alternative to the use of PNS, PCE and lignosulfonates, with improved workability retention and limited impact on setting time in LRWR and MRWR applications.

Example 14—Analysis of Charge Density

Examples 1 and 2 were tested for apparent charge density using potentiometry. The selected method pairs a dilute solution of the sulfonated lignin to be tested with a polymeric cationic titrant. Upon a reversal of the charges in excess in solution, a change in potential is detected using a surfactant sensitive electrode (DS500, Mettler Toledo). Samples from Examples 1 and 2 were treated with calcium chloride to precipitate the residual sulfite. The resulting supernatant solution was adjusted to pH 7 and titrated against poly-diallyldimethylammonium chloride (poly-DADMAC, about 0.005M), with the endpoint used for charge density calculations. The unmodified Kraft lignin (comparative Example 7), commercial PNS (Disal®) and Commercial LR lignosulfonate (Norlig™ 58A) were also tested using the same approach, with no requirement for a precipitation step.

The results of the potentiometry test are reported in Table 3 below. The data show an increase of the charge density in the modified Kraft lignin resulting from the present process. The dispersing ability of the sulfonated lignins resulting from the present process, compared to commercial PNS and lignosulfonates in Example 14, can be viewed in light of the results in table 3. Despite relatively low charge density compared to that of a commercial PNS, and similar to that of a commercial LR Lignosulfonate, the dispersion performance of the sulfonated lignins from the present process surpasses both product classes in LR and MR water reductions. The present process therefore results in a dispersant presenting high dispersion to charge efficacy. As such, it can be construed that the dispersing ability of the sulfonated lignin-containing composition resulting from the present process is not dependent solely on charge density.

TABLE 3

| CHARGE DENSITY | Charge density (meq/g) |
|---|---|
| Example 1 | 1.2 |
| Example 2 | 1.6 |
| Comparative Example 7 | 0.6 |
| Commercial PNS | 3.2 |
| Commercial LR Lignosulfonate | 1.1 |

Several alternative embodiments and examples have been described and illustrated herein. The embodiments described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A process for preparing a dispersant composition comprising a sulfonated lignin, comprising:

preparation of a lignin-containing aqueous suspension having a solids content from about 15 wt % to about 45 wt % and a pH from about 6 to about 12, by mixing a lignin with water;

heating the lignin-containing aqueous suspension to at least about 65° C. and not more than about 95° C. under stirring to obtain a heated lignin-containing aqueous suspension;

sulfonation of the lignin to obtain a sulfonated lignin-containing mixture, by adding a sulfonating agent to the heated lignin-containing aqueous suspension, the sulfonating agent generating a sulfite ion, a bisulfite ion or a mixture thereof in the aqueous suspension, the sulfonation being performed under stirring at a sulfonation temperature of higher than 100° C. and not more than about 160° C., at a sulfonation pH of from about 8.5 to about 11 and using a molar ratio of the sulfonating agent to the lignin between about 0.1:1 to about 0.6:1 on a sulfite to monomeric lignin sub-unit basis, wherein sulfonation reaction time is between 7 hours and about 12 hours; and cooling the sulfonated lignin-containing mixture to produce the dispersant composition of sulfonated lignin, wherein the dispersant composition of sulfonated lignin is used in gypsum manufacturing, drilling fluids, coal or agricultural products.

2. The process of claim 1, wherein the solids content of the lignin-containing aqueous suspension is maintained at about 30 wt % to about 45 wt % during the sulfonation.

3. The process of claim 1, wherein the pH of the lignin-containing aqueous suspension before addition of the sulfonating agent is higher than the sulfonation pH.

4. The process of claim 1, wherein the lignin comprises a Kraft lignin, a soda lignin, or any mixture thereof.

5. The process of claim 1, wherein the lignin is selected from the group consisting of agricultural Kraft lignin, softwood Kraft lignin, hardwood Kraft lignin, agricultural soda lignin, softwood soda lignin, hardwood soda lignin and any mixture thereof.

6. The process of claim 1, wherein the lignin is a purified lignin with a post purification pH of from about 1 to about 10 and is selected from the group consisting of agricultural Kraft lignin, softwood Kraft lignin, hardwood Kraft lignin and any mixture thereof.

7. The process of claim 1, wherein the preparation of the lignin-containing aqueous suspension is performed in the presence of a base to adjust the pH of the lignin-containing aqueous suspension and at a temperature from about 3° C. to about 80° C.

8. The process of claim 1, wherein the preparation of the lignin-containing aqueous suspension is performed in the presence of at least one surface-active agent.

9. The process of claim 1, wherein the lignin-containing aqueous suspension is heated to a temperature from about 80° C. to about 95° C. before the sulfonation.

10. The process of claim 1, wherein the sulfonating agent is selected from the group consisting of gaseous $SO_2$, sodium sulfite, potassium sulfite, sodium bisulfite, potassium bisulfite, sodium metabisulfite, potassium metabisulfite and mixtures thereof.

11. The process of claim 1, wherein the sulfonation comprises:

adding the sulfonating agent to the heated lignin-containing aqueous suspension in one or more addition steps, adding additional water to adjust the solids content or adding additional base to adjust the sulfonation pH, or adding additional water and base to adjust the sulfonation pH and the solids content, and adjusting the sulfonation temperature.

12. The process of claim 1, wherein the molar ratio of the sulfonating agent to the lignin is between about 0.2:1 to about 0.4:1 on a sulfite to monomeric lignin sub-unit basis.

13. The process of claim 1, wherein the sulfonated lignin-containing mixture is cooled to a temperature below 80° C.

14. The process of claim 1, further comprising adjusting the pH of the sulfonated lignin-containing mixture after cooling, to reach a pH from about 8 to about 13.5.

15. The process of claim 1, further comprising reducing the content of volatile organic compounds (VOCs) from the sulfonated lignin-containing mixture before or after the cooling.

16. The process of claim 1, further comprising a sulfite precipitation step before or after the cooling, to obtain a sulfite-free sulfonated lignin-containing mixture, wherein the sulfite precipitation comprises the formation of an insoluble sulfite salt by addition of salt or base to the sulfonated lignin-containing mixture, followed by a physical separation of the insoluble sulfite salt.

17. The process of claim 1, further comprising a drying step to obtain the sulfonated lignin in solid form.

* * * * *